3,251,739
METHOD OF TREATING ANGINA PECTORIS

Aage Petersen, Harasveien 8, Lilleaker, Norway; Erik Hoff, Feltspatveien 34, Lambertseter, Norway; and Ruth Gjermundsen, Bestun, Norway (Vei A, 20 Blakstad, Asker, Norway)
No Drawing. Filed May 1, 1963, Ser. No. 277,086
Claims priority, application Norway, Mar. 14, 1960, 135,186
9 Claims. (Cl. 167—65)

The present application is a continuation-in-part application co-pending with application Serial No. 92,467, filed March 1, 1961, now abandoned.

This invention relates to therapeutically active nitric acid esters. More specifically this invention relates to novel pharmaceutical compositions having cardiovascular activity and to a method for the treatment and prophylaxis of angina pectoris using these compositions. Furthermore these compositions are characterized by having critical amounts of various nitric acid esters of substituted 1,3-propanediols contained therein combined with a pharmaceutical carrier.

In the treatment of angina pectoris, nitroglycerine has been found to be useful because it has a therapeutic value. However, the nitroglycerine treatment has a very short duration owing to the fact that nitroglycerine is decomposed in the liver. In view of this, when nitroglycerine is administered orally, its effectiveness is diminished owing to the fact that it must pass through the liver before passing into the blood circulatory system. Also, nitroglycerine usually gives unpleasant side effects, such as headaches. Thus, nitroglycerine is used almost exclusively as a sublingual tablets when heart attacks occur.

Other preparations with prolonged useful effect for prophylactic treatment of angina pectoris are also well known. Such preparations include, for example, nitric acid esters such as mannitol hexanitrate, erythrityl tetranitrate, triethanolamine trinitrate diphosphate and pentaerythritol tetranitrate; these compounds are also slowly absorbed from the gastrointestinal tract and are rapidly partially decomposed in the liver. Moreover, the clinical results as regards stability and penetration are of doubtful value. The need of a stable, safe and effective oral composition with a minimum of side effects for use in this area has been great.

It is, therefore, an object of the present invention to obtain new therapeutically active nitric acid esters of substituted 1,3-propanediols which can be used for the treatment of angina pectoris.

Accordingly, the present invention is based on the discovery that, from structural chemical considerations, it might be possible to obtain nitric acid esters of substituted 1,3-propanediols possessing a penetration (absorbtion) ability as good as that of nitroglycerine, but which are more effective and have less side effects, and are more stable. The novel medicinal compositions of this invention which contain these nitric acid esters have been unexpectedly found to possess these long sought after characteristics which have been lacking in the above listed prior art compounds used in the prophylactic treatment of angina pectoris.

More specifically the compositions of this invention are in dosage unit form and comprises a nontoxic pharmaceutical carrier and a compound represented by the following formula:

FORMULA 1

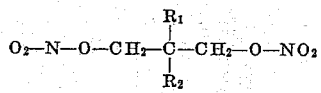

in which $R_1$ and $R_2$ represent lower alkyl groups having a combined carbon range of from 3 to 10 carbons. These compounds can conveniently be made by reacting the free alcohols of the 1,3-propanediols with a nitrating acid under cooling conditions. However, the nitric acid esters can also be prepared by nitrating the 1,3-propanediols with nitric acid in acetic anhydride with cooling. The above obtained compounds possess, as chemical tests have shown, good penetration ability and are very stable. Moreover, they have no unpleasant side effects, such as those obtained for instance when nitroglycerine is used, when dosages of 4 mg. are administered three times daily.

Most advantageously the medicinal compositions of this invention in dosage unit form are comprised of 2-methyl-2-n-propyl-1,3-propanediol dinitrate and a nontoxic pharmaceutical carrier.

The invention includes within its scope pharmaceutical compositions comprising one or more compounds of Formula 1 in association with a pharmaceutical carrier. The carriers used may be of the kind ordinarily used in the manufacture of compositions for therapeutic use and are, of course, chosen in the light of the route of administration to be used. The compounds of the present invention are ordinarily administered orally, as is the usual manner in the prophylactic treatment of angina pectoris, where it is obviously desirable that the patient should administer the drug himself. The oral method of treatment is preferred.

Compositions for oral administration can be administered in any of the usual forms but preferably as tablets, capsules or solutions. They may contain any of the ordinarily used diluents, excipients, binders, or sweetening or flavouring agents.

The ordinary dose of a compound of the invention is of the order of 4 mg. and in consequence the size of, and proportion of active constituent in, tablets should be decided with this in mind.

The excipients used in the making of tablets can be of the ordinary kind and suitable materials are illustrated in the examples given below.

For the making of solutions of the compounds of Formula 1, ethanol, preferably of 96% strength (the remaining 4% being water), or a suitable solvent. Other organic liquids which are pharmaceutically acceptable, such as the oils and esters commonly used in therapeutic preparations, can also be used.

The method in accordance with this invention comprises administering internally a compound of Formula 1 admixed with a pharmaceutical carrier, for example, any of the above compositions. The active ingredient preferably will be, per unit dosage, in an amount of from about 2 mg. to about 200 mg. and advantageously from about 4 mg. to about 100 mg.

The administration may be parenterally or orally, the latter being the preferable route of administration. Advantageously equal dosage units will be administered orally one to four times daily. Preferably the daily dosage will be from about 2 mg. to about 200 mg. and most advantageously from about 8 mg. to about 100 mg. of active medicament in pharmaceutical forms. When the administration described above is carried out either or both prophylaxis and relief from angina pectoris are accomplished.

Alternatively, if a sustained action of the medicament is required, either several unit doses may be administered at one time or a tablet which was prepared using any of the well known sustained release materials, such as, for example, glyceryl monostearate or glyceryl distearate alone or with a wax is administered. In the latter case one tablet administered daily is sufficient.

In order to demonstrate the stability of the 1,3-propanediol esters as compared with the stability of nitroglycerine, tests were conducted with the compound 2-methyl-2-n-propyl-1,3-propanediol dinitrate of the formula:

Formula 2

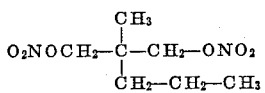

TEST 1

Nitroglycerine (1 mg. per ml.) and 2-methyl-2-n-propyl-1,3-propanediol dinitrate (1 mg. per ml.) were separately allowed to stand in a N/2 potassium hydroxide alcoholic solution at room temperature for 4½ hours, during which time samples were taken at intervals for determining the nitrite content formed by the alkaline saponification of the nitric acid esters. The following table gives the results obtained:

Table 1

| Nitroglycerine: | 2-methyl-2-n-propyl-1,3-propanediol dinitrate, percent |
|---|---|
| 1 hour, 70% | 0 |
| 4½ hours, 100% | 0 |

Percent nitric acid ester decomposed by alcoholic potassium hydroxide at room temperature.

It is to be noted from the above Table 1, that when nitroglycerine and 2-methyl-2-n-propyl-1,3-propanediol dinitrate were subjected to alcoholic potassium hydroxide at room temperature, the 2-methyl-2-n-propyl-1,3-propanediol dinitrate remained unaffected after the one hour and four hour periods; whereas the nitroglycerine was 70% decomposed after one hour, and totally decomposed after four hours.

TEST 2

Nitroglycerine and 2-methyl-2-n-propyl-propanediol dinitrate, 65 mcg./ml., were added to a suspension of pig liver homogenisate in an aqueous borate buffer pH 7.8 and placed in a thermostat at 37° C. for 120 min. Samples were taken at intervals for determination of nitrite, this compound being formed when nitric acid esters are decomposed by liver enzymes. The results are given in Table 2.

Table 2

| Nitroglycerine: | 2-methyl-2-n-propyl-1,3-propanediol dinitrate, percent |
|---|---|
| 15 minutes, 10.9% | 0 |
| 30 minutes, 13.6% | 0 |
| 1 hour, 21% | 3.3 |
| 1½ hours, 27% | 3.3 |
| 2 hours, 34% | 3.3 |

Percent acid ester decomposed by liver homogenisate at 37° pH 7.8.

It can be seen from the above Table 2 that under the trial conditions nitroglycerine is rather quickly decomposed by pig liver, whilst 2-methyl-2-n-propyl-propanediol dinitrate is still practically intact after the two hours' period.

The predictions based on the stability tests have later been confirmed by clinical trials with 2-methyl-2-n-propyl-1,3-propanediol dinitrate.

As previously mentioned, the nitric acid esters according to this invention, are prepared by reacting the free 1,3-propane alcohols with nitric-sulfuric acid. Accordingly, at least two moles of concentrated nitric acid and a sufficient amount of concentrated sulfuric acid (which acts as a water-binding agent) is used per mole of free alcohol. Similarly, when nitric acid esters are prepared by nitrating the free 1,3-propane alcohols with nitric acid in acetic anhydride, the nitric acid must be used in amounts of two moles of nitric acid per mole of free alcohol, and a sufficient amount of acetic anhydride as the water-binding agent. It is thus seen that both the acetic anhydride, and the concentrated sulfuric acid are used as water-binding agents. The yield obtained by this reaction is of the order of 90%.

The following examples are illustrative of the method of preparing the compounds of this invention. They are inserted without any view of limiting the invention.

EXAMPLE 1

475 g. 2-methyl-2-n-propyl-1,3-propanediol were added during 1 hour to a mixture of 1080 ml. concentrated nitric acid and 1080 ml. concentrated sulfuric acid under stirring and ice-cooling to below 6° C. After further 3 hours' stirring and cooling the oil layer was separated, 1 l. ether added and the ether solution washed with 3 x 250 ml. ice-water, then with 2 x 150 ml. ice cold saturated sodium bicarbonate solution, and finally with 2 x 100 ml. ice-water. The ether solution was dried over $Na_2SO_4$ and kept cold.

Yield: 1150 ml. solution containing 710 g.=89% 2-methyl-2-n-propyl-1,3-propanediol dinitrate.

A sample was distilled in vacuum and gave no forerun or afterrun.

B.P. 66–67°C./0.2 mm.

Analysis.—Calculated for $C_7H_{14}N_2O_6$: C, 37.84; H, 6.36. Found: C, 37.83; H, 6.49.

Small quantities of the above nitric acid ester were subjected to impact on a hot-plate at 80° C. and also by dropping onto a glowing plate without exploding. However, 0.5 g. of this nitric acid ester was mildly deflagrated by heating to the boiling point in a test tube.

EXAMPLE 2

The same mole proportions and reaction conditions were used as in Example 1 to obtain 2,2-diethyl-1,3-propanediol dinitrate, except that 2,2-diethyl-1,3-propanediol was used as one of the starting materials.

B.P. 78° C./0.4 mm.

Analysis.—Calculated for $C_7H_{14}N_2O_6$: C, 37.84; H, 6.35. Found: C, 37.84; H, 6.51.

EXAMPLE 3

The same mole proportions and reaction conditions were used as in Example 1 to obtain 2-ethyl-2-n-butyl-1,3-propanediol dinitrate, except that 2-ethyl-2-n-butyl-1,3-propanediol was used as one of the starting materials.

B.P. 98.5° C./0.6 mm.

Analysis.—Calculated for $C_9H_{18}N_2O_6$: C, 43.19; H, 7.25. Found: C, 43.39; H, 7.27.

EXAMPLE 4

To 165 g. acetic anhydride at 20–25° under stirring and suitable cooling in an ice/NaCl bath, 20 ml. concentrated nitric acid was added dropwise during 15 min. The evolution of heat ceased immediately when addition of the nitric acid was completed.

After 1 hour at 20° 13.2 g. 2-methyl-2-n-propyl-1,3-propanediol was added in small amounts during 10 min. at 15° under cooling, and then left at the same temperature for a further 30 min. The reaction mixture was then poured into 400 ml. ice-water and 2-methyl-2-n-propyl-1,3-propanediol dinitrate isolated as described in Example 1.

Yield: 19.3 g.=87%.

B.P. 74° C./0.3 mm.

EXAMPLE 5

Tablets weighing 200 mg. each are made in the conventional manner from 4 mg. of 2,2-diethyl-1,3-propanediol dinitrate and 196 mg. of a carrier consisting of, by weight, 49% of glycine, 49% of urea, 1% of gelatin and 1% of magnesium stearate.

EXAMPLE 6

Tablets weighing 200 mg. each are made in the conventional manner from 4 mg. of 2-methyl-2-n-propyl-1,3-propanediol dinitrate and 196 mg. of a vehicle consisting of, by weight, sucrose 90%, glucose, 3%, talc 6.5% and magnesium stearate 0.5%.

EXAMPLE 7

A solution containing 1% by weight of 2-methyl-2-n-propyl-1,3-propanediol dinitrate in 96% aqueous ethanol is prepared. This composition should be administered in drops.

EXAMPLE 8

Capsules are prepared each containing 4 mg. of 2-methyl-2-n-propyl-1,3-propanediol dinitrate dissolved in 246 mg. of arachis oil enclosed in a conventional gelatin/glycerin capsule of suitable size.

What is claimed is:

1. The method of treatment and prophylaxis for angina pectoris which comprises internally administering to a patient in an amount sufficient to induce said treatment and prophylaxis a nitrate ester having the formula:

$$O_2-N-O-CH_2-\underset{\underset{R_2}{|}}{\overset{\overset{R_1}{|}}{C}}-CH_2-O-NO_2$$

in which $R_1$ and $R_2$ are lower alkyl groups having a combined carbon range of from 3 to 10 carbon atoms inclusive.

2. The method of claim 1 in which $R_1$ is methyl and $R_2$ is n-propyl.

3. The method of claim 2 in which said treatment is oral.

4. The method of treatment and prophylaxis for angina pectoris which comprises internally administering to a patient a dosage of from about 4 mg. to about 25 mg. of a nitrate ester having the formula:

$$O_2-N-O-CH_2-\underset{\underset{R_2}{|}}{\overset{\overset{R_1}{|}}{C}}-CH_2-O-NO_2$$

in which $R_1$ and $R_2$ are lower alkyl groups having a combined carbon range of from 3 to 10 carbon atoms inclusive.

5. The method of claim 4 characterized in that 4 mg. of the nitrate ester is administered three times daily.

6. The method of claim 4 in which $R_1$ is methyl and $R_2$ is n-propyl.

7. The method of treatment and prophylaxis for angina pectoris which comprises internally administering to a patient a daily dosage regimen of from about 2 mg. to about 200 mg. of a nitrate ester having the formula:

$$O_2-N-O-CH_2-\underset{\underset{R_2}{|}}{\overset{\overset{R_1}{|}}{C}}-CH_2-O-NO_2$$

in which $R_1$ and $R_2$ are lower alkyl groups having a combined carbon range of from 3 to 10 carbon atoms inclusive.

8. The method of claim 7 characterized in that $R_1$ is methyl and $R_2$ is n-propyl.

9. The method of claim 7 in which the administering is oral.

References Cited by the Examiner

UNITED STATES PATENTS 2,066,506   1/1937   Woodbury et al. _____ 44—9

OTHER REFERENCES

Remington's Practice of Pharmacy, 11th edition, chapter 53, pages 754–757.

New England Journal of Medicine, vol. 261, No. 20, p. 1018, November 12, 1959, and vol. 261, No. 22, pp. 1126–28, November 26, 1959.

SAM ROSEN, *Primary Examiner.*

J. LEAVITT, M. J. COHEN, *Examiners.*